(12) United States Patent
Kawana

(10) Patent No.: US 7,461,122 B2
(45) Date of Patent: Dec. 2, 2008

(54) MUSIC DELIVERY SYSTEM

(75) Inventor: Yuta Kawana, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 734 days.

(21) Appl. No.: 10/810,570

(22) Filed: Mar. 29, 2004

(65) Prior Publication Data

US 2004/0194611 A1 Oct. 7, 2004

(51) Int. Cl.
*G06F 15/16* (2006.01)
*H04N 7/18* (2006.01)

(52) U.S. Cl. .......................... 709/203; 725/86

(58) Field of Classification Search ......... 709/217–219, 709/203, 231; 725/86; 84/600
See application file for complete search history.

(56) References Cited

U.S. PATENT DOCUMENTS

| | | | | |
|---|---|---|---|---|
| 5,824,934 | A * | 10/1998 | Tsurumi et al. | 84/609 |
| 6,232,539 | B1 * | 5/2001 | Looney et al. | 84/609 |
| 6,437,229 | B1 * | 8/2002 | Nobumoto | 84/615 |
| 6,846,979 | B2 * | 1/2005 | Kondo | 84/609 |
| 6,975,994 | B2 * | 12/2005 | Black et al. | 704/275 |
| 6,985,949 | B2 * | 1/2006 | Inamori et al. | 709/225 |
| 2002/0049037 | A1 * | 4/2002 | Christensen et al. | 455/3.06 |
| 2002/0138641 | A1 * | 9/2002 | Taylor et al. | 709/231 |

FOREIGN PATENT DOCUMENTS

| | | |
|---|---|---|
| DE | 19743249 | 4/1998 |
| JP | 2001-242874 A | 9/2001 |
| JP | 2002-33832 A | 1/2002 |
| JP | 2002-189483 1 | 7/2002 |
| JP | 2002-334031 | 11/2002 |
| JP | 2003-084783 | 3/2003 |

* cited by examiner

*Primary Examiner*—Krisna Lim
(74) *Attorney, Agent, or Firm*—Birch, Stewart, Kolasch & Birch, LLP

(57) ABSTRACT

A music delivery system enables a user to listen to desired music at low cost anywhere and any time. It has a server including a music data storage for storing music data uploaded from a personal computer, and a processor for generating a speech-based interactive document describing an interactive procedure with a car navigation system in accordance with information in the music data uploaded from the personal computer. In response to a download request from the car navigation system, the server transmits the speech-based interactive document generated by the processor to the car navigation system. The car navigation system retrieves and downloads desired music data from the music data storage of the server through interaction with the server in accordance with the speech-based interactive document received from the server.

29 Claims, 7 Drawing Sheets

MUSIC DELIVERY SYSTEM

BACKGROUND OF THE INVENTION

1. Field of the Invention

The present invention relates to a music delivery system, and more particularly to a technique for automatically generating procedure data for acquiring music data from a server.

2. Description of Related Art

As a conventional system for selecting a desired music data file from an enormous number of music data files stored in a server, and for downloading the data selected to a user terminal, a music distribution system is known which includes a music distribution system server storing music software, and a music distribution system terminal for communicating with the music distribution system server via a public communication network (see, Relevant reference 1, for example). The music distribution system terminal of the music distribution system transmits music software information in the form of a speech signal to the music distribution system server. The music software information includes the title and the name of the artist, which are input via a microphone to identify the desired music software. The music distribution system server extracts the music software information by the speech recognition of the speech signal, retrieves the music software from a music software storage in accordance with the music software information extracted, and transmits the desired music software to the music distribution system terminal. The music distribution system can distribute the desired music software quickly with a simple operation.

As a related technique, a speech input-type music retrieval system used for retrieving a desired piece by uttering the name of a singer or title of the tune, thereby making a play reservation of the piece (see, Relevant reference 2, for example). The speech input-type music retrieval system recognizes the speech a user input via an interactive interface, and generates a recognized character string. The character string includes the title, a tune attribute and a delimiter. The speech input-type music retrieval system detects the delimiter in the recognized character string, and identifies the title and tune attribute as search words in accordance with the delimiter. In addition, it searches the music index database for the hit record using the search words, and exhibits the user with the title and music attribute via the interactive interface. Thus, it can automatically extract the search words from a series of the speech data including a plurality of search words, thereby enabling the high-precision music retrieval.

Using such a conventional system, the user can select a desired musical piece from an enormous number of musical pieces stored in the server provided by a music distribution carrier, downloads the selected one and pays the cost to the music distribution carrier.

Incidentally, to listen to music in an automobile, for example, a user brings a music recording medium such as a CD, DVD or MD into the automobile, and puts it into an audio system to replay the music. As for such a music recording medium, the user purchases the medium containing the music information from a music shop, or uses the medium recording the music information downloaded from the music distribution system.

However, there is a limit to the number of the music recording media placeable in the automobile, and to bring the music recording media in the automobile is rather cumbersome. In view of this, the music distribution system is conceived that accesses a music distribution server from a terminal on an automobile via the Internet, and downloads a desired music data file at cost. The music distribution system enables the user to listen to the desired music in the automobile whenever he or she likes.

Relevant reference 1: Japanese patent application laid-open No. 2001-242874.

Relevant reference 2: Japanese patent application laid-open No. 2002-189483.

The foregoing conventional music distribution system, however, has a problem of putting a heavy load on the user because it compels the user to download the music at cost which has already been stored in the music recording medium the user possesses. Thus, the development of a system is required which enables the user to listen to the music that is recorded in the music recording media of the user, anywhere and any time at low cost without bringing the music recording media into the car, even a mobile terminal such as a car audio system.

SUMMARY OF THE INVENTION

The present invention is implemented to respond to the foregoing requirement. It is therefore an object of the present invention to provide a music delivery system enabling a user to listen to a desired musical piece at low cost anywhere and any time.

To accomplish the object, according to one aspect of the present invention, there is provide a music delivery system comprising: a music data storage for storing music data uploaded from a first terminal; a second terminal for retrieving and downloading desired music data from the music data storage by interacting with the server in accordance with interactive procedure data received from the server; and a processor for generating the interactive procedure data in accordance with information contained in the music data every time the first terminal uploads the music data, the interactive procedure data describing an interactive procedure with the second terminal.

Thus, the user can listen to a desired musical piece at low cost anywhere and any time by operating the second terminal.

DETAILED DESCRIPTION OF THE PREFERRED EMBODIMENTS

The invention will now be described with reference to the accompanying drawings.

Embodiment 1

Figure 1:
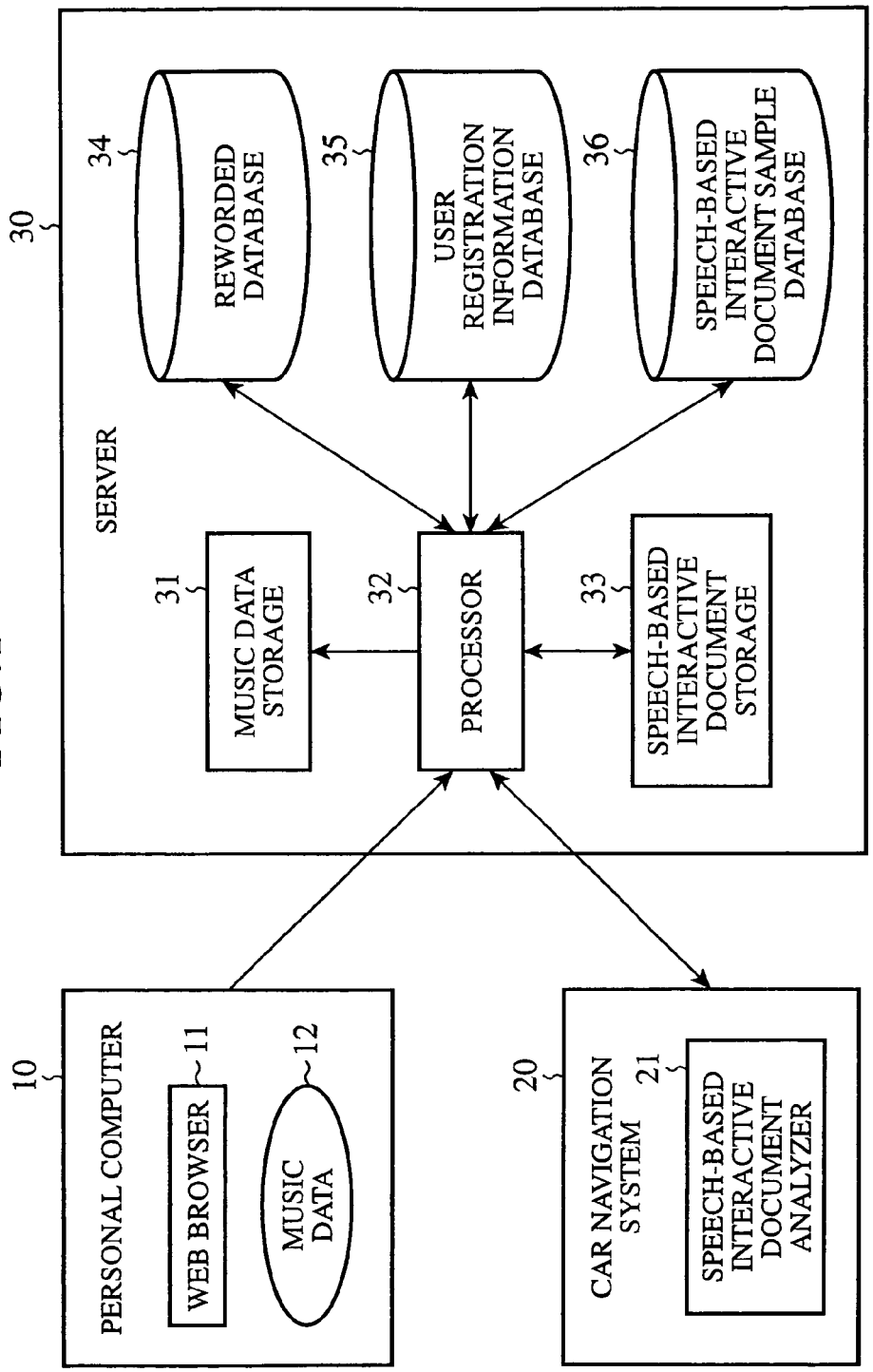
FIG. 1 is a block diagram showing a configuration of an embodiment 1 of a music delivery system in accordance with the present invention.

FIG. 1 is a block diagram showing a configuration of an embodiment 1 of a music delivery system in accordance with the present invention. The music delivery system comprises a personal computer 10, a car navigation system 20 and a server 30. The personal computer 10 and car navigation system 20 are connected to the server 30 via the Internet, for example.

The personal computer 10, which corresponds to a first terminal in accordance with the present invention, is owned by a user personally. The personal computer 10 includes a WEB browser 11, which enables the user to make access to the Internet. In addition, the personal computer 10 stores music data 12.

The WEB browser 11 is software used for browsing a site on the Internet. The WEB browser 11 is used to make access to the server 30 when uploading music data 12.

The music data 12 are stored in a user's recording medium such as a CD, DVD, MD or the hard disk of the personal computer 10. The music data each consist of a header including its title and the name of the artist, and the data on the music. The music data 12 are encoded into an MP3 format, for example, followed by being uploaded to the server 30 as a music data file.

The car navigation system 20 has a function of making access to the Internet through speech-based interaction besides an ordinary navigation function. Furthermore, the car navigation system 20 has a function to send the music data to an audio system not shown to playback the music.

Figure 7:
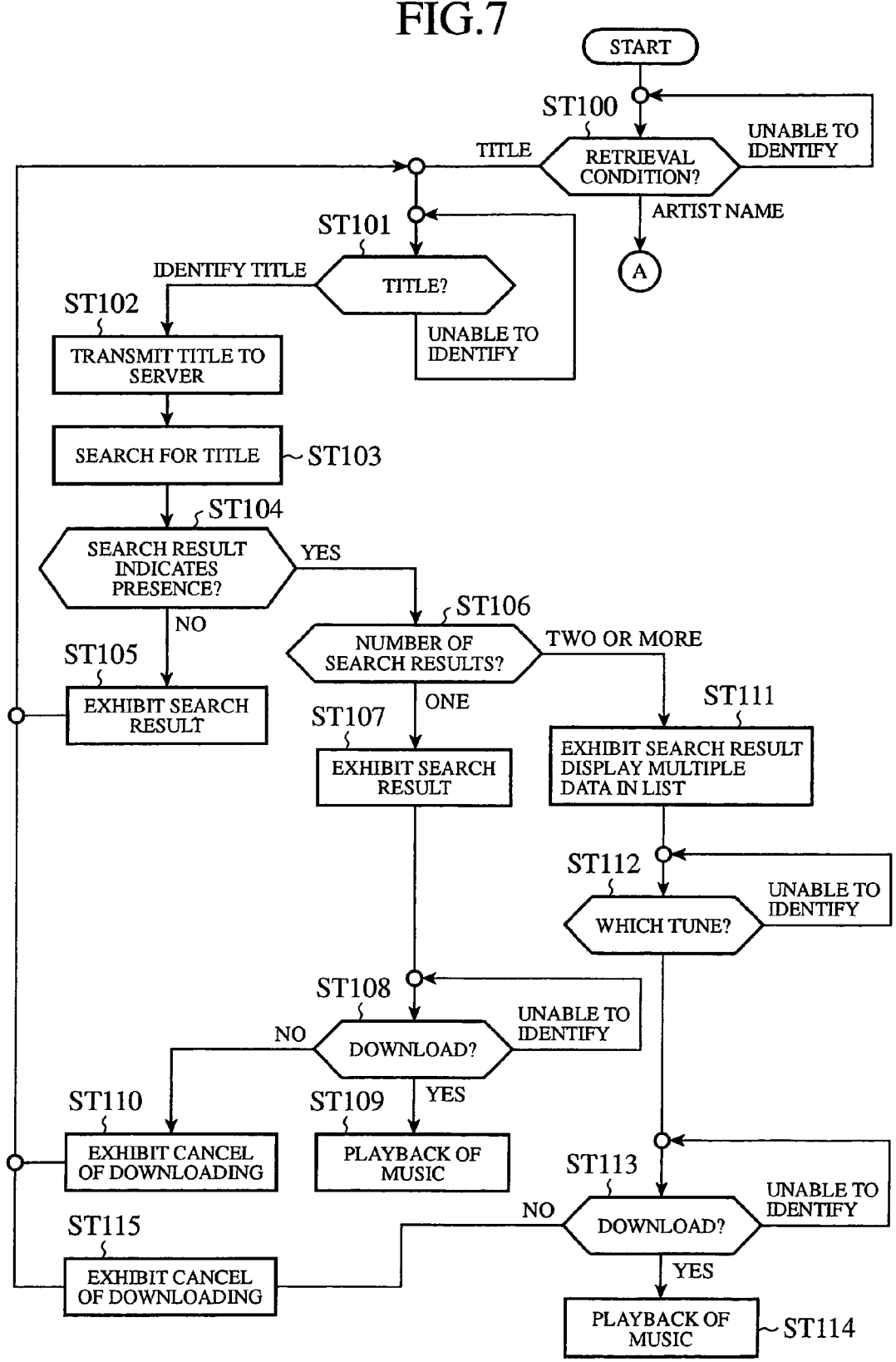
FIG. 7 is a diagram showing a part of an example of a speech-based interactive document used by the embodiment 1 of the music delivery system in accordance with the present invention.
Figure 8:
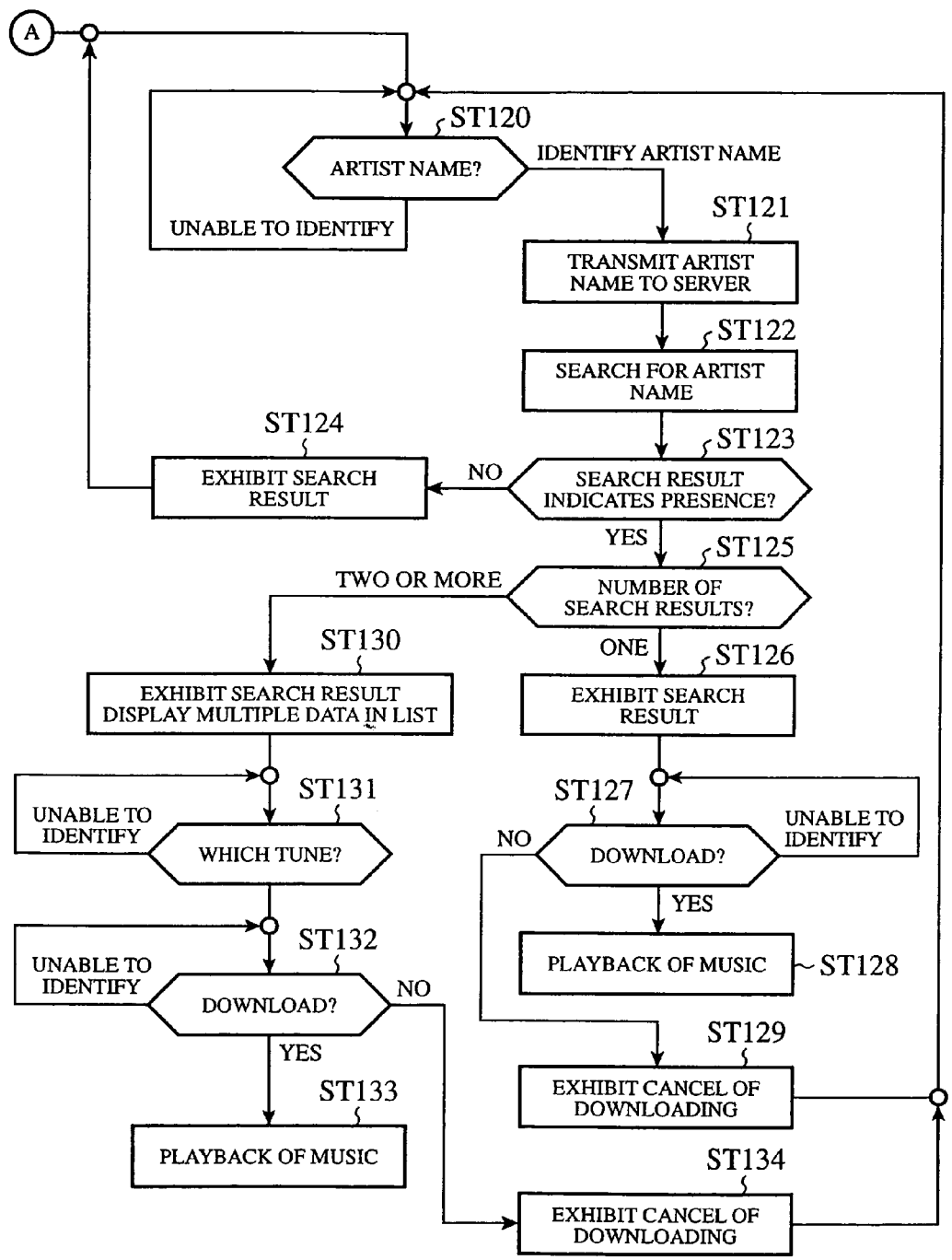
FIG. 8 is a diagram showing another part of the example of the speech-based interactive document used by the embodiment 1 of the music delivery system in accordance with the present invention.

The car navigation system 20 has a speech-based interactive document analyzer 21 of a speech-based interactive document, that is, the speech-based interactive procedure data. The speech-based interactive document analyzer 21 interprets the speech-based interactive document downloaded from the server 30, and carries out speech synthesis and speech recognition, thereby implementing the speech-based interaction between the car navigation system 20 and server 30. The speech-based interactive document is a document that describes interactive procedures by speech as illustrated in FIGS. 7 and 8 using an interactive descriptive language such as Voice XML (Voice extensible Markup Language).

The server 30 comprises components such as a server computer, workstations and general-purpose computers, which are connected to the Internet. As the server 30, it is possible to use a rental server that enables the user to exclusively use a memory space with a predetermined capacity. Besides the rental server, a various types of servers accessible via the Internet can also be used as the server 30.

The server 30 includes a music data storage 31, a processor 32, a speech-based interactive document storage 33, a reworded database (DB) 34, a user registration information database (DB) 35 and a speech-based interactive document sample database (DB) 36.

The music data storage 31 stores the MP3-format music data file transmitted from the personal computer 10 via the Internet. The user selects a desired music data file from a plurality of music data files stored in the music data storage 31, and downloads it.

The processor 32 automatically generates the speech-based interactive document, and stores it in the speech-based interactive document storage 33. The details of the configuration and operation of the processor 32 will be described later.

The speech-based interactive document storage 33 stores the speech-based interactive document generated by the processor 32. When the server 30 receives a download request from the car navigation system 20, it transmits the speech-based interactive document stored in the speech-based interactive document storage 33 to the car navigation system 20. Thus, the speech-based interaction between the car navigation system 20 and the server 30 becomes possible.

The reworded database 34 stores other names of each artist, that is, reworded words, in correspondence with the name of the artist. The reworded words include names such as the family name only, the first name only, nickname and abbreviation of the artist.

The user registration information database 35 stores the attributes of the music data files uploaded, namely, the titles, the names of the artists and the reworded words. The data stored in the user registration information database 35 are used to generate a title search dictionary and an artist name search dictionary (details of which will be described later) referred to by the speech-based interactive document.

The title search dictionary is used in a processing that makes an inquiry "What is the title?" for example. Likewise, the artist name search dictionary is used in a processing that makes an inquiry "What is the name of the artist?" The speech-based interactive document utilizes besides the foregoing dictionaries, a common dictionary used for processing the inquiries other than the foregoing questions. The common dictionary is not generated dynamically because inquiries and responses are determined in advance.

The speech-based interactive document sample database 36 stores speech-based interactive document samples. Each speech-based interactive document sample is the same as the speech-based interactive document as illustrated in FIGS. 7 and 8 except that it is not linked with the title search dictionary and artist name search dictionary.

Figure 2:
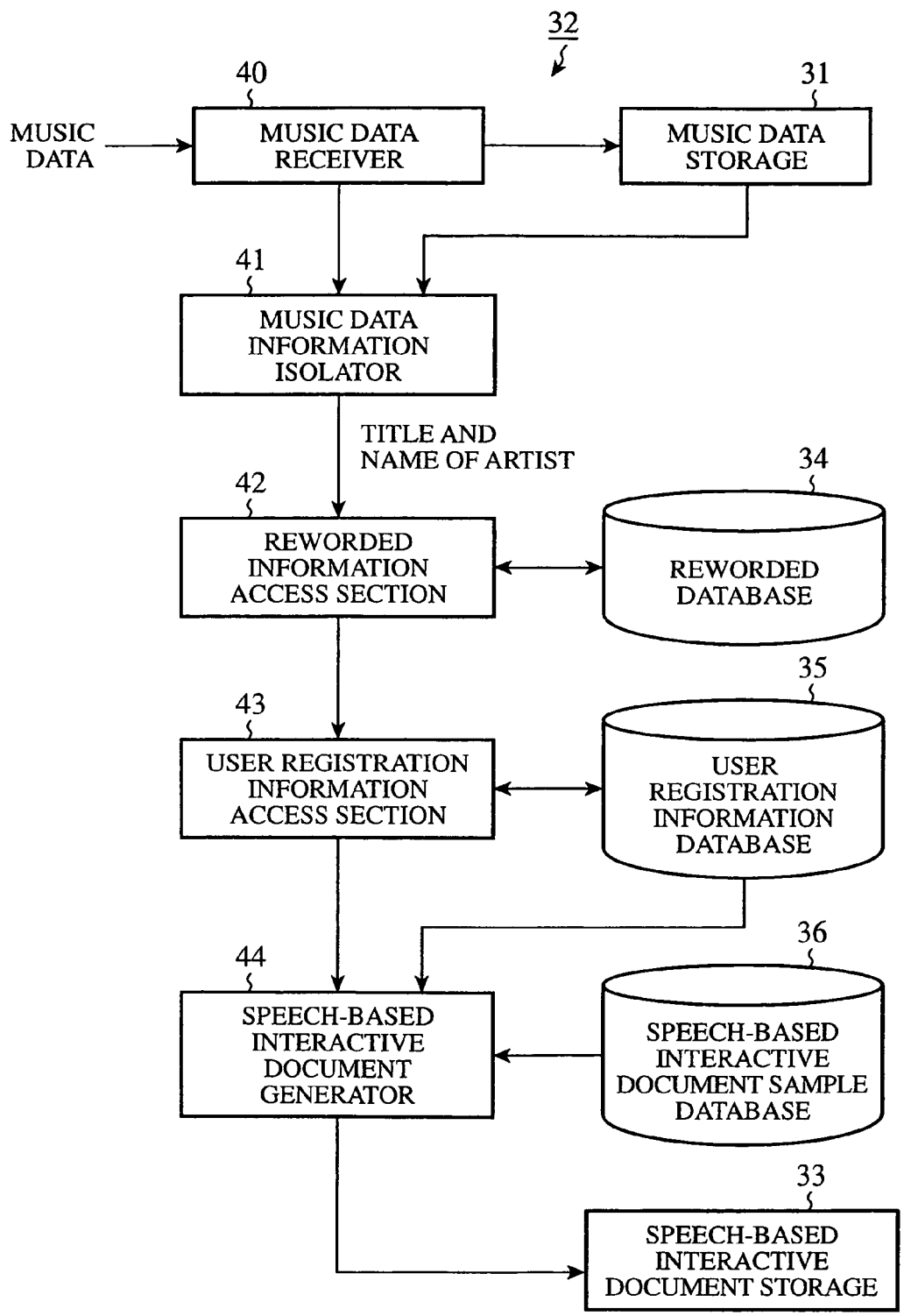
FIG. 2 is a block diagram showing a detailed configuration of the processor of the server as shown in FIG. 1.

FIG. 2 is a block diagram showing a detailed configuration of the processor 32 as shown in FIG. 1. The processor 32 includes a music data receiver 40, a music data information isolator 41, a reworded information access section 42, a user registration information access section 43 and a speech-based interactive document generator 44.

The music data receiver 40 receives the music data file uploaded from the personal computer 10, and stores it in the music data storage 31.

The music data information isolator 41 extracts the title and the name of the artist from the header or file name of the music data file fed from the music data receiver 40. The title and the name of the artist acquired are supplied to the reworded information access section 42.

The reworded information access section 42 accesses the reworded database 34, and checks the presence and absence of the reworded words using the name of the artist fed from the music data information isolator 41 as a search key. As a result of the check, if the reworded words are not present, the title and the name of the artist are supplied to the user registration information access section 43. In contrast, if the reworded words are present, the reworded words are fed to the user registration information access section 43 together with the title and the name of the artist.

The user registration information access section 43 stores the title, the name of the artist and the reworded words (if present) fed from the music data information isolator 41 in the user registration information database 35.

Acquiring a speech-based interactive document sample from the speech-based interactive document sample database 36, and the title, the name of the artist and the reworded words (if present) from the user registration information database 35, the speech-based interactive document generator 44 generates the speech-based interactive document from them. The speech-based interactive document generated by the speech-based interactive document generator 44 is stored in the speech-based interactive document storage 33.

Next, the operation of the embodiment 1 of the music delivery system in accordance with the present invention will be described.

Figure 3:
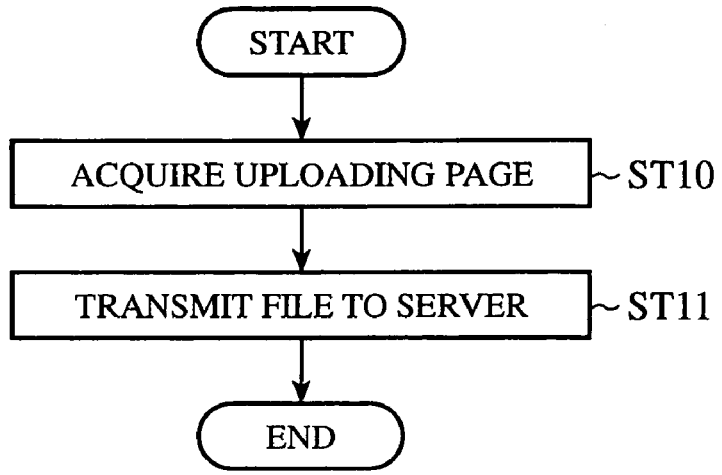
FIG. 3 is a flowchart illustrating an uploading operation of the personal computer as shown in FIG. 1.

First, the uploading operation of the music data by the personal computer 10 will be described with reference to the flowchart as illustrated in FIG. 3.

First, the user carries out the uploading operation using the WEB browser 11 installed in the personal computer 10. Thus, the personal computer 10 makes access to the server 30 via the Internet, and acquires an uploading page (step ST10).

Subsequently, the user has the music data stored in the CD, DVD, MD or hard disk encoded to the MP3 format, thereby generating the music data file. Then, on the uploading page acquired at step ST10, the user carries out the transmission operation of the music data file, and the personal computer 10 transmits the music data file to the server 30 (step ST11).

Thus, the uploading operation of the music data file to the server 30 by the personal computer 10 has been completed. Although MP3 is used as the format of the music data file in the embodiment 1 considering that it has a high compression ratio and hence imposes only a small transmission load, the format of the music data file is not limited to MP3, but can be determined flexibly.

Figure 4:
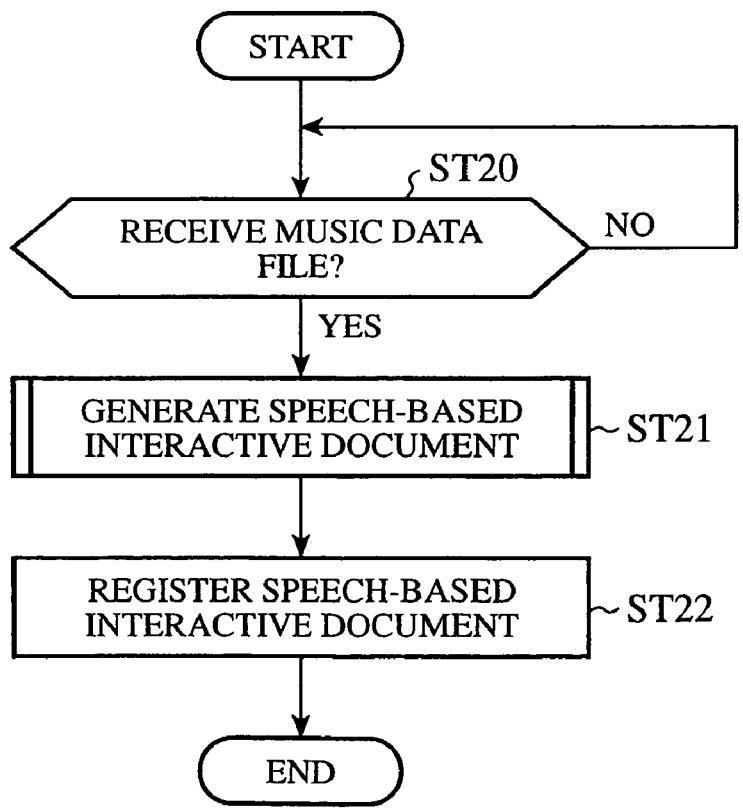
FIG. 4 is a flowchart illustrating the operation of the server as shown in FIG. 1 in response to the uploading.

Next, the operation of the server 30, which is performed in response to the uploading, will be described with reference to the flowchart as illustrated in FIG. 4. In the normal condition, the server 30 is placed in a standby mode while checking whether the music data file is received or not (step ST20). If it receives the music data file, the server 30 passes control to the processor 32 to carry out the speech-based interactive document generating processing (step ST21). Although the details of the speech-based interactive document generating processing will be described later, it generates the speech-based interactive document.

Subsequently, the server 30 carries out the speech-based interactive document registration processing (step ST22). In the speech-based interactive document registration processing, the speech-based interactive document generated at step ST21 is stored in the speech-based interactive document storage 33. Thus, the processing of the server 30 performed in response to the uploading from the personal computer 10 is completed, thereby enabling the car navigation system 20 to download the music data.

Figure 5:
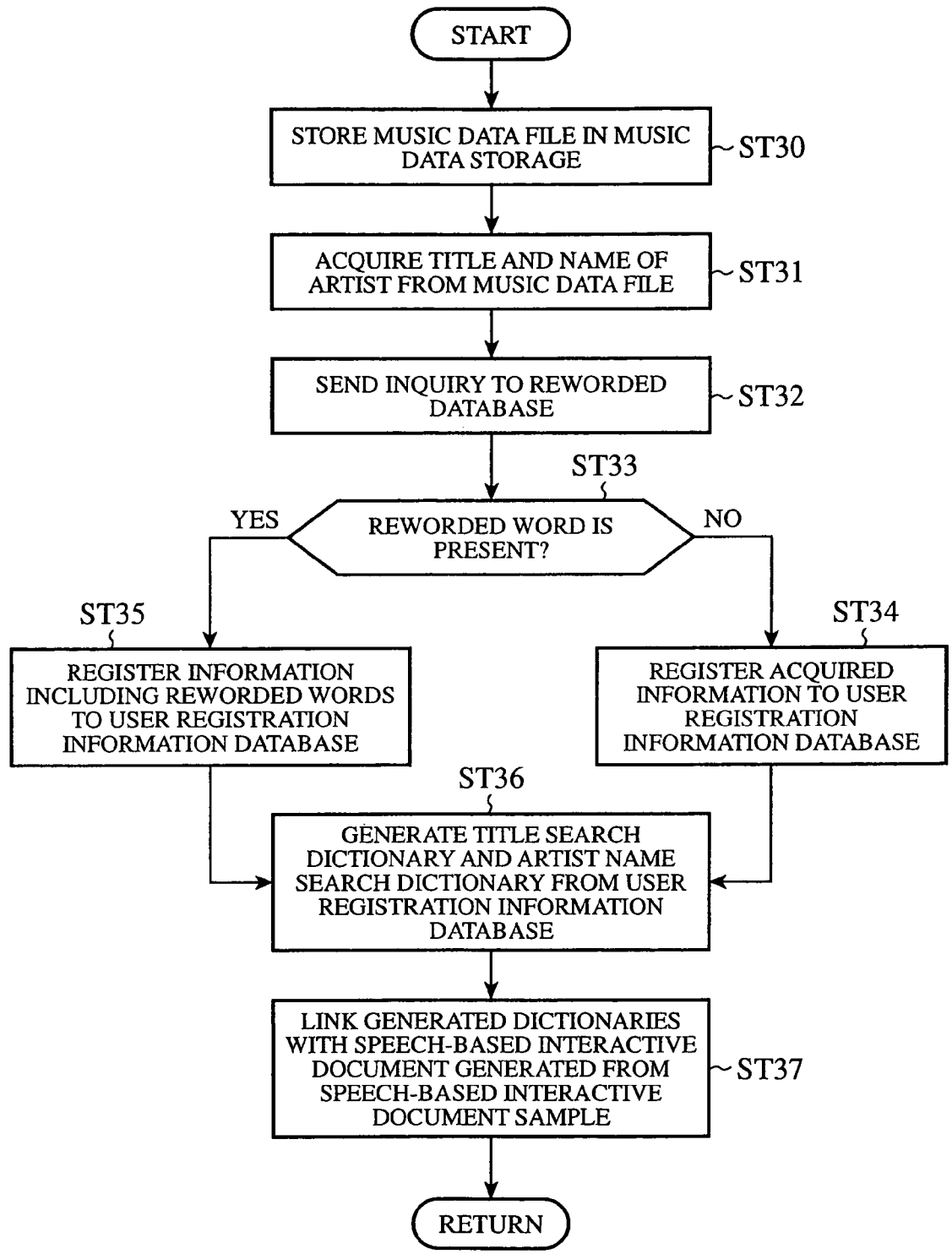
FIG. 5 is a flowchart illustrating details of the speech-based interactive document generating processing in FIG. 4.

Next, the details of the speech-based interactive document generating processing carried out at step ST21 will be described with reference to the flowchart illustrated in FIG. 5.

In the speech-based interactive document generating processing, the music data receiver 40 of the server stores the received music data file in the music data storage 31, first (step ST30). Subsequently, it passes control to the music data information isolator 41.

The music data information isolator 41 reads the music data file stored at step ST30 from the music data storage 31, and acquires the title and the name of the artist from the header or file name of the music data file (step ST31). Subsequently, it passes control to the reworded information access section 42.

The reworded information access section 42 carries out an inquiry to the reworded database 34 (step ST32). More specifically, the reworded information access section 42 makes an access to the reworded database 34, and searches for the presence and absence of the reworded words using the name of the artist fed from the music data information isolator 41 as a search key.

Subsequently, referring to the result of the inquiry at step ST32, the reworded information access section 42 makes a decision as to whether the reworded words are present or not (step ST33). If a decision is made that the reworded words are not present at step ST33, the user registration information access section 43 registers the title and the name of the artist acquired at step ST31 to the user registration information database 35 (step ST34). Subsequently, it passes control to the speech-based interactive document generator 44.

On the other hand, if a decision is made that the reworded words are present step ST33, the user registration information access section 43 registers the reworded words together with the title and the name of the artist acquired at step ST31 in the user registration information database 35 (step ST35). Subsequently, it passes control to the speech-based interactive document generator 44.

Subsequently, the speech-based interactive document generator 44 generates the title search dictionary and the artist name search dictionary on the basis of the contents stored in the user registration information database 35 (step ST36). Subsequently, the speech-based interactive document generator 44 generates the speech-based interactive document by linking the title search dictionary and the artist name search dictionary generated at step ST35 with the speech-based interactive document sample read from the speech-based interactive document sample database 36 (step ST37). Thus, the speech-based interactive document generating processing is completed, and the sequence is returned to the processing of making a response to the uploading.

As described above, every time the music data file is uploaded from the personal computer 10, the server 30 generates the title search dictionary and the artist name search dictionary with reference to the user registration information database 35, and links them to the speech-based interactive document sample, thereby dynamically generating a user-specific speech-based interactive document. Accordingly, it is not necessary for the user to generate the dictionary for making speech-based interaction.

Figure 6:
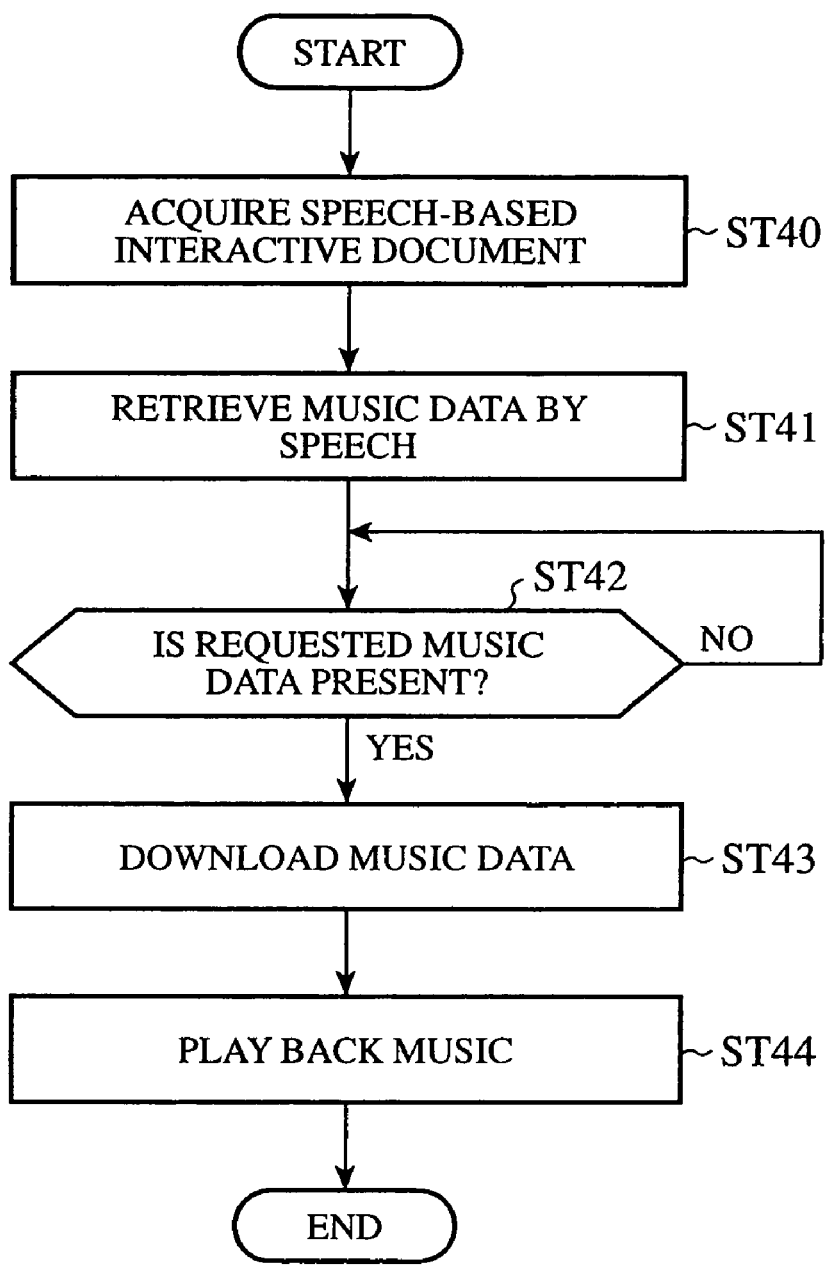
FIG. 6 is a flowchart illustrating the downloading and playback operation of the car navigation system as shown in FIG. 1.

Next, the downloading and playback operation of the car navigation system 20 will be described with reference to the flowchart as illustrated in FIG. 6.

The user who wishes to obtain the music data acquires the speech-based interactive document, first (step ST40). More specifically, the user operates the car navigation system 20 to transmit a download request to the server 30. In response to the download request, the server 30 transmits the speech-based interactive document stored in the speech-based interactive document storage 33 to the car navigation system 20.

Receiving the speech-based interactive document from the server 30, the car navigation system 20 activates the speech-based interactive document analyzer 21. When activated, the speech-based interactive document analyzer 21 sequentially analyzes the contents described in the speech-based interactive document, and carries out the speech-based interaction with the server 30. A concrete example of the speech-based interaction will be described later. Thus, the retrieval of the requested music data is made by the speech-based interaction (step ST41).

Subsequently, the car navigation system 20 makes a decision as to whether the requested music data is present or not with reference to the result of the retrieval at step ST41 (step ST42). If it makes a decision that the requested music data is present, it downloads the music data (step ST43). Subsequently, the car navigation system 20 plays back the music in accordance with the downloaded music data (step ST44). More specifically, the car navigation system 20 supplies the music data downloaded from the server 30 to the audio system, which plays back the music in accordance with the music data received. Thus, the car navigation system completes the downloading and playback processing of the music data.

FIGS. 7 and 8 each illustrate the speech-based interactive document describing a procedure of the speech-based interaction in the form of a flowchart. The procedure will be described of downloading a desired music data file from the server 30 and playing it back by the car navigation system 20 through the speech-based interaction using the speech-based interactive document.

Transmitting the download request to the server 30, the car navigation system 20 downloads the speech-based interactive document, and activates the speech-based interactive document analyzer 21 which inquires of the user "What is a retrieval condition?" by the speech synthesis (step ST100). In response to the inquiry, the user utters the term "title" or "name of artist", which is a retrieval condition. In response to the utterance, the speech-based interactive document analyzer 21 carries out the speech recognition processing using the common dictionary. If the speech recognition processing cannot identify the utterance, it inquires of the user "What is the retrieval condition?" again.

When the speech recognition processing identifies the utterance "title" at step ST100, it subsequently inquires "What is title?" (step ST101). In response to the inquiry, the user utters the title. In response to the utterance, the speech-based interactive document analyzer 21 carries out the speech recognition processing using the title search dictionary. If the speech recognition processing cannot identify the utterance, it inquires of the user "What is the title?" again.

When the speech recognition processing can recognize the utterance "title" at step ST101, the navigation system 20 transmits the title to the server 30 (step ST102). The server 30 searches music data storage 31 using the title as the search key, and transmits the result of the search to the car navigation system 20 (step ST103).

Subsequently, referring to the result of the search received, the car navigation system 20 makes a decision as to whether the music data corresponding to the requested title is present or not (step ST104). If it decides that no music data corresponding to the requested title is present, it exhibits the result of the search (step ST105). The exhibition is made by showing on the display of the car navigation system 20 that the music data corresponding to the requested title is not present. Subsequently, the processing is returned to step ST101. In contrast, if the car navigation system 20 makes a decision that the music data corresponding to the requested title is present, the number of the music data is checked (step ST106). If there is only one music data, the result of the search is exhibited (step ST107). The exhibition is made by showing on the display of the car navigation system 20, for example, that only one music data corresponding to the request title is present.

Subsequently, the car navigation system 20 makes an inquiry "download?" (step ST108). In response to the inquiry, the user utters "Yes" or "No". In response to the utterance, the car navigation system 20 carries out the speech recognition processing using the common dictionary. If the speech recognition processing cannot identify the utterance, it makes an inquiry "download?" again.

If the speech recognition processing at step ST108 identifies the utterance "Yes", the music data file is downloaded from the server 30, and played back (step ST109), thereby completing the downloading and playback processing. On the other hand, if the car navigation system 20 identifies the utterance "No", it exhibits the cancel of the downloading (step ST110). The exhibition is made by showing on the display of the car navigation system 20, for example, that the downloading is canceled. Subsequently, the processing is returned to step ST101.

If the car navigation system 20 makes a decision that two or more music data are present at step ST106, it exhibits the result of the search (step ST111). The exhibition is made by showing on the display of the car navigation system 20, for example, the retrieved music data in list form with assigning serial numbers to the data. Subsequently, the car navigation system 20 makes an inquiry "Which tune?" (step ST112). In response to the inquiry, the user utters the number assigned to the desired music data. In response to the utterance, the car navigation system 20 carries out the speech recognition processing using the common dictionary. If the speech recognition processing cannot identify the utterance, the car navigation system 20 makes the inquiry "Which tune?" again.

When the speech recognition processing at step ST112 can identify the utterance of the number by the speech recognition, the car navigation system 20 makes the inquiry "Download?" (step ST113). In response to the inquiry, the user utters "Yes" or "No". In response to the utterance, the car navigation system 20 carries out the speech recognition processing using the common dictionary. If the speech recognition processing cannot identify the utterance, the car navigation system 20 makes the inquiry "Download?" again.

If the speech recognition processing at step ST113 identifies the utterance "Yes", the music data file is downloaded from the server 30, and played back (step ST114), thereby completing the downloading and playback processing. On the other hand, if the car navigation system 20 identifies the utterance "No", it exhibits the cancel of the downloading (step ST115). The exhibition is made by showing on the display of the car navigation system 20, for example, that the downloading is canceled. Subsequently, the processing is returned to step ST101.

When the speech recognition processing at step ST100 identifies the utterance "name of artist", the car navigation system 20 makes an inquiry "What is the name of artist?" (step ST120). In response to the inquiry, the user utters the name of the artist. In response to the utterance, the car navigation system 20 carries out the speech recognition processing using the artist search dictionary. If the speech recognition processing cannot identify the utterance, it makes an inquiry "name of artist?" again.

When the recognition processing at step ST120 can identify the utterance of the name of the artist by the speech recognition, the car navigation system 20 transmits the name of the artist to the server 30 (step ST121). The server 30 searches the music data storage 31 using the name of the artist as the search key (step ST122), and transmits the result of the search to the car navigation system 20.

Subsequently, referring to the result of the search received, the car navigation system 20 makes a decision as to whether the music data corresponding to the name of the requested artist is present or not (step ST123). If it makes a decision that the music data corresponding to the name of the requested artist is not present, it exhibits the result of the search (step ST124). The exhibition is made by showing on the display of the car navigation system 20, for example, that the music data corresponding to the name of the requested artist is not present. Subsequently, the processing is returned to step ST120. In contrast, if the car navigation system 20 makes a decision that the music data corresponding to the name of the requested artist is present, the number of the music data is checked (step ST125). If there is only one music data, the result of the search is exhibited (step ST126). The exhibition is made by showing on the display of the car navigation system 20, for example, that only one music data corresponding to the request title is present.

Subsequently, the car navigation system 20 makes an inquiry "download?" (step ST127). In response to the inquiry, the user utters "Yes" or "No". In response to the utterance, the car navigation system 20 carries out the speech recognition processing using the common dictionary. If the speech recognition processing cannot identify the utterance, it makes an inquiry "download?" again.

If the speech recognition processing at step ST127 identifies the utterance "Yes", the music data file is downloaded from the server 30, and played back (step ST128), thereby completing the downloading and playback processing. On the other hand, if the car navigation system 20 identifies the utterance "No", it exhibits the cancel of the downloading (step ST110). The exhibition is made by showing on the display of the car navigation system 20, for example, that the downloading is canceled. Subsequently, the processing is returned to step ST101.

If the car navigation system 20 makes a decision that two or more music data are present at step ST125, it exhibits the result of the search (step ST130). The exhibition is made by showing on the display of the car navigation system 20, for example, the retrieved music data in list form with assigning serial numbers to the data. Subsequently, the car navigation system 20 makes an inquiry "Which tune?" (step ST131). In response to the inquiry, the user utters the number assigned to the desired music data. In response to the utterance, the car navigation system 20 carries out the speech recognition processing using the common dictionary. If the speech recognition processing cannot identify the utterance, the car navigation system 20 makes the inquiry "Which tune?" again.

When the speech recognition processing at step ST131 can identify the utterance of the number by the speech recognition, the car navigation system 20 makes the inquiry "Download?" (step ST132). In response to the inquiry, the user utters "Yes" or "No". In response to the utterance, the car navigation system 20 carries out the speech recognition processing using the common dictionary. If the speech recognition processing cannot identify the utterance, the car navigation system 20 makes the inquiry "Download?" again.

If the speech recognition processing at step ST132 identifies the utterance "Yes", the music data file is downloaded from the server 30, and played back (step ST133), thereby completing the downloading and playback processing. On the other hand, if the car navigation system 20 identifies the utterance "No", it exhibits the cancel of the downloading (step ST134). The exhibition is made by showing on the display of the car navigation system 20, for example, that the downloading is canceled. Subsequently, the processing is returned to step ST120.

As described above, the embodiment 1 of the music delivery system in accordance with the present invention uploads to the server 30 the music data stored in the recording medium the user possesses such as a CD, DVD, MD and hard disk after encoding the music data into MP3 music data or the like. Thus, it can download a desired music data from the server 30 whenever the user likes by the speech-based interaction via the car navigation system 20 or like. In this case, the downloading of the music data file stored in the server 30 is free of charge because it is possessed by the user. Accordingly, the user can enjoy the music at low cost.

In addition, according to the embodiment 1 of the music delivery system in accordance with the present invention, the speech-based interactive document is generated dynamically and automatically every time the music data is uploaded from the personal computer 10. Therefore it is not necessary for the user to have any knowledge of the speech-based interactive document descriptive language. Furthermore, since the speech-based interactive document is generated by using the speech-based interactive document sample that is prepared in advance, and by linking to it the title search dictionary and the artist name search dictionary, the speech-based interactive document can be created quickly.

Moreover, since the reworded words is available as the search key for the music data uploaded to the server 30 besides the title and the name of the artist, the user can retrieve a desired music even if he or she forgets the name of the artist, or knows only the nickname or abbreviation of the artist.

Although the foregoing embodiment 1 is configured such that the music data stored in the music data storage 31 is retrieved through the speech-based interaction, this is not essential. For example, a configuration is also possible which retrieves the music data stored in the music data storage 31 by interaction via a keyboard.

Although the foregoing embodiment 1 employs the car navigation system as a second terminal, this is not essential. For example, any terminals such as a mobile computer and PDA (Personal Data Assistant) are also applicable as the second terminal besides the car navigation system.

Although the foregoing embodiment 1 is configured such that it registers the reworded words of only the name of an artist in the reworded database 34, and retrieves a desired tune using the name of the artist and its reworded words as the search key, this is not essential. For example, it can register the reworded words of a title in the reworded database 34, and retrieve a desired tune using the title and its reworded words as the search key.

Finally, although the foregoing embodiment 1 is configured such that it retrieves a desired tune using the title, the name of the artist and the reworded words as the search key for retrieving the music data, a configuration is also possible which retrieves a desired tune using part of the lyrics of a song as the search key.

What is claimed is:

1. A music delivery system comprising:

a server;

a first terminal for uploading music data to said server;

a music data storage for storing the music data uploaded from said first terminal;

a second terminal for retrieving and downloading desired music data from said music data storage by interacting with said server in accordance with interactive procedure data received from said server; and a processor for generating the interactive procedure data from the music data every time said first terminal uploads the music data, the interactive procedure data comprising identifying information about the music data and describing an interactive procedure with said second terminal.

2. A music delivery system comprising:

a server;

a first terminal for uploading music data to said server;

a music data storage for storing the music data uploaded from said first terminal;

a second terminal for retrieving and downloading desired music data from said music data storage by interacting with said server in accordance with interactive procedure data received from said server; and
a processor for generating the interactive procedure data in accordance with information contained in the music data every time said first terminal uploads the music data, the interactive procedure data describing an interactive procedure with said second terminal,
wherein the interactive procedure data generated by said processor consists of speech-based interactive procedure data that describes a procedure for carrying out speech interaction with said second terminal.

3. The music delivery system according to claim 2, further comprising a speech-based interactive procedure data sample database for storing a sample of the speech-based interactive procedure data, wherein
said processor generates, every time the music data is uploaded from said first terminal, the speech-based interactive procedure data by associating information contained in the music data with the speech-based interactive procedure data sample.

4. The music delivery system according to claim 2, further comprising a reworded database for storing reworded words that restate information contained in the music data uploaded from said first terminal, wherein
said processor generates speech-based interactive procedure data by associating a speech-based interactive procedure data sample with information contained in the music data uploaded from said first terminal and with the reworded words stored in said reworded database.

5. The music delivery system of claim 2, wherein said second terminal is an automobile navigation system.

6. The music delivery system of claim 2, wherein said first terminal is an automobile navigation system.

7. The music delivery system of claim 2, wherein said second terminal is a digital computing device.

8. The music delivery system of claim 2, wherein said first terminal is a digital computing device.

9. The music delivery system of claim 2, wherein said uploading music data is accomplished via the Internet.

10. The music delivery system of claim 2, wherein said uploading music data is accomplished through wireless signal transmission.

11. The music delivery system of claim 2, wherein said retrieving and downloading is accomplished via the Internet.

12. The music delivery system of claim 2, wherein said retrieving and downloading is accomplished through wireless signal transmission.

13. The music delivery system of claim 2, wherein said first terminal is comprised of a digital music database.

14. The music delivery system of claim 2, wherein said second terminal is comprised of a digital music player.

15. A media upload device of a media delivery system having a server, a music data storage for storing the music data uploaded to said server, a terminal for retrieving and downloading desired music data from said music data storage by interacting with said server in accordance with interactive procedure data received from said server, and a processor for generating the interactive procedure data from the music data every time music data is uploaded to said server, the interactive procedure data comprising identifying information about the music data and describing an interactive procedure with said terminal;
said media upload device comprising:
a digital computing device that:
accepts and transmits data via a data transmission network,
reads recorded music from digital storage media,
authenticates a data connection with said server,
uploads music data to said server,
displays, when an authenticated connection to said server is established, the contents of said server that the user of said device is authorized to view,
requests the deletion, during the course of said authenticated connection, of any portion of said contents that said user is authorized to delete.

16. The media upload device of claim 15, said device further comprising an automobile navigation system.

17. A media presentation device in a music delivery system having a server, a terminal for uploading music data to said server, a music data storage for storing the music data uploaded from said first terminal, and a processor for generating the interactive procedure data from the music data every time said first terminal uploads the music data, the interactive procedure data comprising identifying information about the music data and describing an interactive procedure with said second terminal;
said media presentation device comprising:
a digital computing device that:
retrieves and downloads desired music data from said music data storage by interacting with said server in accordance with interactive procedure data received from said server,
accepts and transmits data via a data transmission network,
plays recorded music downloaded to said device,
establishes an authenticated connection to said server,
accepts voice commands from an operator of said device,
determines if said voice commands conform with said interactive procedure data, and
transmits said voice commands to said server if said commands conform with said interactive procedure data.

18. The media presentation device of claim 17, said device further comprising an automobile navigation system.

19. A computer-readable medium, having encoded thereon a program that performs the function of media presentation in a music delivery system having a server, a first terminal for uploading music data to said server, a music data storage for storing the music data uploaded from said first terminal, a second terminal for retrieving music data from said music data storage, and a processor for generating the interactive procedure data from the music data every time said first terminal uploads the music data, the interactive procedure data comprising identifying information about the music data and describing an interactive procedure with said second terminal;
said program, when executed by said second terminal, performs the steps of:
interacting with said server in accordance with interactive procedure data received from said server,
accepting and transmitting data via a data transmission network,
playing recorded music downloaded to said second terminal,
establishing an authenticated connection to said server,
identifying music for download from said music data storage in accordance with interactive procedure data received from said server,
downloading music data from said music data storage,
accepting voice commands from an operator of said device,
determining if said voice commands conform with said interactive procedure data, and transmitting said voice commands to said server if said commands conform with said interactive procedure data.

20. The program of claim 19, said second terminal further comprising an automobile navigation system.

21. A server device in a music delivery system having a first terminal for uploading music data to said server, a music data storage for storing the music data uploaded from said first terminal, a second terminal for retrieving and downloading desired music data from said music data storage by interacting with said server in accordance with interactive procedure data received from said server, and a processor for generating the interactive procedure data from the music data every time said first terminal uploads the music data, the interactive procedure data comprising identifying information about the music data and describing an interactive procedure with said second terminal;

said server device comprising:
a digital computing device that:
accepts and transmits data,
controls the receipt, storage and transmission of digital music data and interactive procedure data,
controls the functions of said music data storage, and
controls the functions of said processor.

22. A method of serving music data in a music delivery system having a server, a first terminal for uploading music data to said server, a music data storage for storing the music data uploaded from said first terminal, a second terminal for retrieving and downloading desired music data from said music data storage by interacting with said server in accordance with interactive procedure data received from said server, and a processor for generating the interactive procedure data from the music data every time said first terminal uploads the music data, the interactive procedure data comprising identifying information about the music data and describing an interactive procedure with said second terminal;

said method comprising:
accepting a data transmission connection request from said first terminal;
during the course of a data transmission connection between said server and said first terminal:
accepting transmitted music data from said first terminal;
engaging said processor to generate said interactive procedure data;
transmitting said accepted music data and said generated interactive procedure data to said music data storage;
accepting a data transmission connection request from said second terminal;
during the course of a data transmission connection between said server and said second terminal:
accepting music retrieval or download commands transmitted from said second terminal;
transmitting requests for music content based on said accepted commands to music data storage;
transmitting music content identified by said accepted commands from music data storage to said second terminal.

23. A method of processing music data in a music delivery system having a server, a first terminal for uploading music data to said server, a music data storage for storing the music data uploaded from said first terminal, and a second terminal for retrieving and downloading desired music data from said music data storage by interacting with said server in accordance with interactive procedure data received from said server;

said method comprising:
generating interactive procedure data from the music data every time said first terminal uploads the music data, the interactive procedure comprising identifying information about the music data and data describing a speech-based interactive procedure with said second terminal;
reading said music data to generate speech-based identifying information from music data being uploaded;
associating generated identifying information with said music data being uploaded;
comparing said generated identifying information with previous speech-based identifying information associated with other tracks of music data contained in said music storage to locate identical or similar identifying information suitable for association with said music data being uploaded;
comparing said generated identifying information with previous identifying information determined for other tracks of music data contained in said music storage to identify previously uploaded music data suitable for association with said generated identifying information;
associating identifying information from said comparing steps with music data from said comparing steps based on suitability.

24. The method of claim 23, said identifying information comprising speech-based variations of artist name, album title, track title, or lyric fragments to be included in voice commands transmitted from said second terminal.

25. A method of delivering music to media presentation device, said method comprising:
uploading music to a server;
storing the music uploaded to the server;
processing the uploaded music to generate, from uploaded music data, interactive procedure data that comprises speech-based identifying information about the music data and data describing an interactive procedure for requesting a music download, said interactive procedure describing a procedure for carrying out a speech-based request for music download;
associating said interactive procedure data with said music uploaded to the server;
interacting with said server in accordance with interactive procedure data received from said server;
accepting and transmitting data via a data transmission network;
playing recorded music downloaded to said media presentation device;
establishing an authenticated connection between said device and said server;
identifying music for download to said device in accordance with interactive procedure data received from said server;
accepting voice commands from an operator of said device;
determining if said voice commands conform with said interactive procedure data;
transmitting said voice commands to said server if said commands conform with said interactive procedure data; and
transmitting music to a playback device upon receipt of a request for music from the presentation device to the server, said request being a verbal request input into said presentation device, and said request being in conformance with the interactive procedure defined in said processing step.

26. The method of claim 25, said speech-based identifying information further comprising the name of an album, the name of an artist, the name of a specific song, or a portion of the lyrics of a specific song.

27. The method of claim 25, said media presentation device comprising an automobile navigation system.

28. A processing device in a music delivery system having a server, a first terminal for uploading music data to said server, a music data storage for storing the music data uploaded from said first terminal, and a second terminal for retrieving and downloading desired music data from said music data storage by interacting with said server in accordance with interactive procedure data received from said server;

said processing device comprising:
   a digital computing device that:
      generates interactive procedure data from the music data every time said first terminal uploads the music data, the interactive procedure comprising identifying information about the music data and data describing a speech-based interactive procedure with said second terminal;

reads said music data to generate speech-based identifying information from music data being uploaded;

associates generated identifying information with said music data being uploaded;

compares said generated identifying information with previous speech-based identifying information associated with other tracks of music data contained in said music storage to locate identical or similar identifying information suitable for association with said music data being uploaded;

compares said generated identifying information with previous identifying information determined for other tracks of music data contained in said music storage to identify previously uploaded music data suitable for association with said generated identifying information; and associates identifying information from said comparing steps with music data from said comparing steps based on suitability.

29. The device of claim 28, said identifying information comprising speech-based variations of artist name, album title, track title, or lyric fragments to be included in voice commands transmitted from said second terminal.

* * * * *